United States Patent [19]
Vetter et al.

[11] Patent Number: 6,154,933
[45] Date of Patent: Dec. 5, 2000

[54] FASTENING DEVICE FOR FLAT COMPONENTS

[75] Inventors: Johannes Vetter, Laufach; Michael Tracht, Ingolstadt, both of Germany

[73] Assignee: TRW Automotive Safety Systems GmbH & Co. KG, Aschaffenburg, Germany

[21] Appl. No.: 09/354,653

[22] Filed: Jul. 16, 1999

[30] Foreign Application Priority Data

Jul. 16, 1998 [DE] Germany ......... 298 12 707 U

[51] Int. Cl.⁷ ............. A44B 21/00; E05F 17/00; F16B 5/00
[52] U.S. Cl. ............. 24/295; 24/289; 24/293; 24/297; 411/508
[58] Field of Search ............. 24/295, 293, 294, 24/297, 289, 458; 411/508

[56] References Cited

U.S. PATENT DOCUMENTS

| 1,959,096 | 5/1934 | Fernberg | 24/295 |
|---|---|---|---|
| 2,616,142 | 11/1952 | Tinnerman | 24/458 |
| 2,655,072 | 10/1953 | Poupitch | 24/295 |
| 3,864,789 | 2/1975 | Leitner | |
| 3,893,211 | 7/1975 | Skinner | |
| 4,710,852 | 12/1987 | Keen | 24/295 |
| 5,099,549 | 3/1992 | Hullmann | 24/295 |

FOREIGN PATENT DOCUMENTS

| 824444 | 8/1951 | Germany |
| 1916649 | 5/1965 | Germany |
| 3245056 | 7/1984 | Germany |

*Primary Examiner*—Victor N. Sakran
*Attorney, Agent, or Firm*—Tarolli, Sundheim, Covell, Tummino & Szabo L.L.P.

[57] ABSTRACT

A device for fastening a first flat component (1) to a second flat component (2) comprises a spring clip (3). The second component (2) has a rectangular recess (4) which is engaged by the first component (1) with two opposing, angled plane material sections (5) in which slot-type recesses (6) are configured oriented parallel to the second component (2). The spring clip (3) has a U- or V-shaped cross-section and outwardly bent flanges (7). These flanges (7) are inserted between the material sections (5) and supported in the first component (1). The angled flanges (7) of the spring clip (3) extend in a final fitted position through the slot-type recesses (6) and engage behind the second component (2).

9 Claims, 4 Drawing Sheets

FASTENING DEVICE FOR FLAT COMPONENTS

The invention relates to a device for fastening a first flat component to a second flat component.

BACKGROUND OF THE INVENTION

Spring clips are often used alone or together with other fastening elements in many shapes and sizes for connecting components. They mostly consist of spring steel or a high-strength, elastic material and are in general shaped so that they are capable of assuming within elastic limits two differing final shapes, of which the one corresponds an engaging or releasing function and the other to the fastening function. It is often the case that the material properties of the spring clip are utilized not only to produce a positive interlock connection between two components but also to additionally or exclusively transmit forces between the components.

Thus, from DE 3303254 A1 for instance, a quick fastener for connecting two components provided with coaxial holes is known in which the actual fastening element comprises a U-shaped spring clip and a shaped pin. The spring clip is insertable through a fitting opening of the one component for connecting to this component by means of outwardly protruding tongues. On this first component a second component may be placed with an elastic seal sandwiched inbetween so that the hole in the second component is coaxially located with the hole in the first component or in the spring clip. Then, the pin needs to be introduced from above, splaying the spring clip and following rotation of the pin through 90° the spring clip springs back into a latching position. In this arrangement the components are pressed against each other in the fitting direction by the spring clip whilst the pin inserted in the holes transmits the forces in a plane perpendicular to the fitting direction. Since the spring clip is not visible from without, there is no recognizing whether it is arranged in the intended position and whether with rotation of the pin through 90° the desired fixing position and not, for instance, the release position is actually set. In intermediate positions too, the fastening function of the known device may be questionable.

A similar fastening device is known from GB 1465262 A, in which in addition to a spring clip and a locking pin further components belong to the fastening element which is thus substantially more complicated and expensive than the quick fastener as described before. From EP 0662559 A1 a fastener for releasably connecting two components is also known in which a spring clip is used which, however, is likewise multi-part and thus more complicated than the quick fastener requiring merely a spring clip and a pin.

All of the known fastening devices are thus hardly of any use when there is a need to connect two flat components with but a single fastening element so that they can be loaded in the fitting direction with substantial forces and are capable of assuring in a plane perpendicular thereto a mutual, dead-fit and durable location of the two components.

SUMMARY OF THE INVENTION

The invention provides a fastening device permitting two generally flat components to be connected to each other reliably and dimensionally stable with a sole fastening element.

In accordance with the invention, the second component has a rectangular recess which is engaged by the first component with two opposing, angled plane material sections in which slot-type recesses are configured oriented parallel to the second component. A spring clip has a U- or V-shaped cross-section and outwardly bent flanges. These flanges are insertable between the material sections and supportable in the first component. The angled flanges of the spring clip extend in a final assembly position through the slot-type recesses and engage behind the second component.

The gist of the invention is to ensure by correspondingly shaping the flat components concerned that the so-called ancillary forces, i.e. the forces needing to be transferred in a plane perpendicular to the fitting direction of the fastening element can be transferred by the components themselves and that the fastening element merely needs to ensure that the two components are pressed against each other in the fitting direction and that in this direction considerable forces, which would otherwise cause the components to be separated from each other, can be transmitted.

The fitting conditions are often such that the rear side of the one component to be connected to the other is not accessible, a change in position of the elements involved in the fastening device thus no longer being possible and, therefore, some uncertainty frequently exists as to whether the desired connection has actually been made between the two components. Thus, for example, air bag modules are built into the dashboard, the driver's or front passenger seat and in vehicle doors without being able to check the fastening from the rear side. For such cases it needs to be assured that the fastening element has attained the desired final fastening position and thus the connection produced also withstands the loads materializing in an explosive inflation of the air bag. The device in accordance with the invention satisfies all of these requirements, suffices with a single fastening element and may also be again removed when required.

BRIEF DESCRIPTION OF THE DRAWINGS

Further details will now be explained with reference to the example embodiments illustrated in the FIGS. 1 to 8 in which.

DESCRIPTION OF PREFERRED EMBODIMENTS

Figure 1:
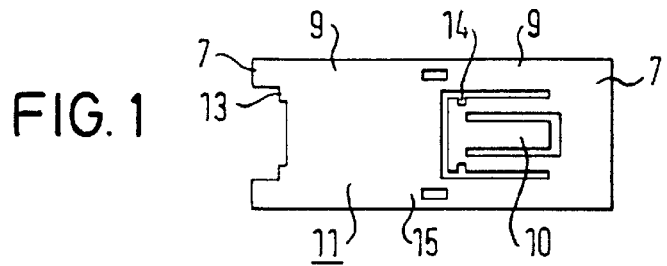
FIG. 1 shows a sheet metal section from which a spring clip as shown in FIGS. 2 and 3 can be formed
Figure 2:
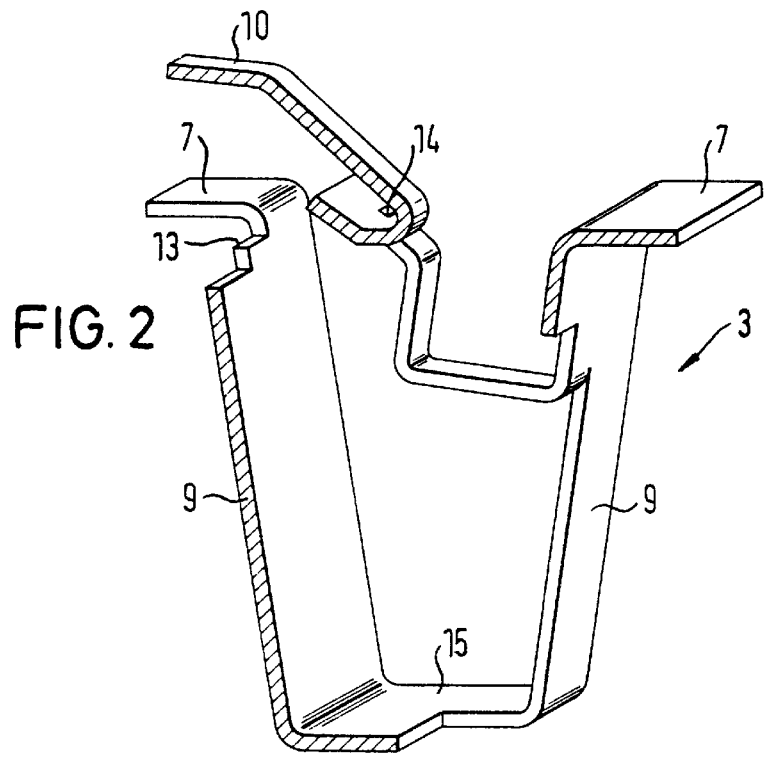
FIG. 2 is a section through a spring clip in the relaxed condition

Referring now to FIG. 1 there is illustrated a sheet metal section comprising a base region 15, two legs 9 emanating therefrom with end flanges 7 as well as a lever 10 and recesses 14 or protuberances 13 forming together a hook-in device when the sheet metal section as shown in FIG. 2 is shaped by being angled.

Figure 3:
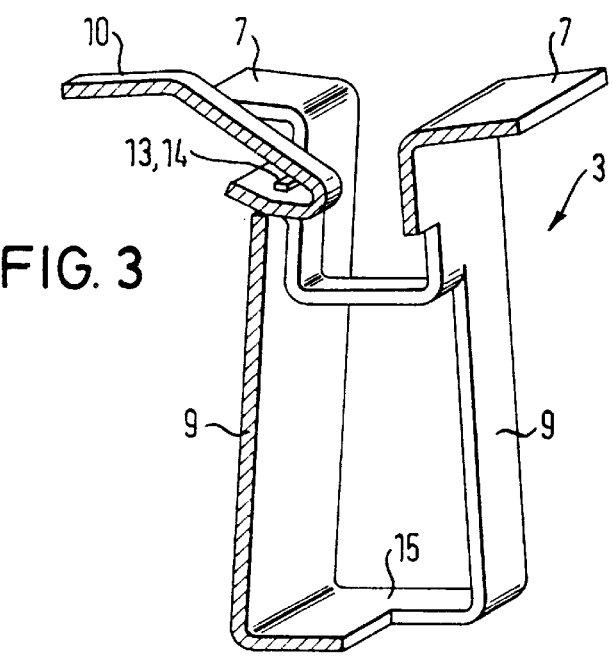
FIG. 3 is a section through the same spring clip in the tensioned condition

Referring now to FIGS. 2 and 3, each illustrate sections taken along the horizontal centerline of the sheet metal section as shown in FIG. 1. Starting from the base region 15 the legs are bent upwards approximately at right angles and end at the top in flanges 7 which, in turn, are bent outwards approximately at right angles. The lever 10 is produced from the free-stamped middle part by multiple angling, the end of the lever being located above the left-hand flange 7 when the spring clip as shown in FIG. 2 is relaxed. This is the shape the spring clip automatically assumes when it is not tensioned by means of the hook-in device 13, 14 as evident from FIG. 3. Before the spring clip 3 can be used as a fastening element it must first be translated into the tensioned shape as shown in FIG. 3 so that it can be introduced into the fastening position.

Figure 4:
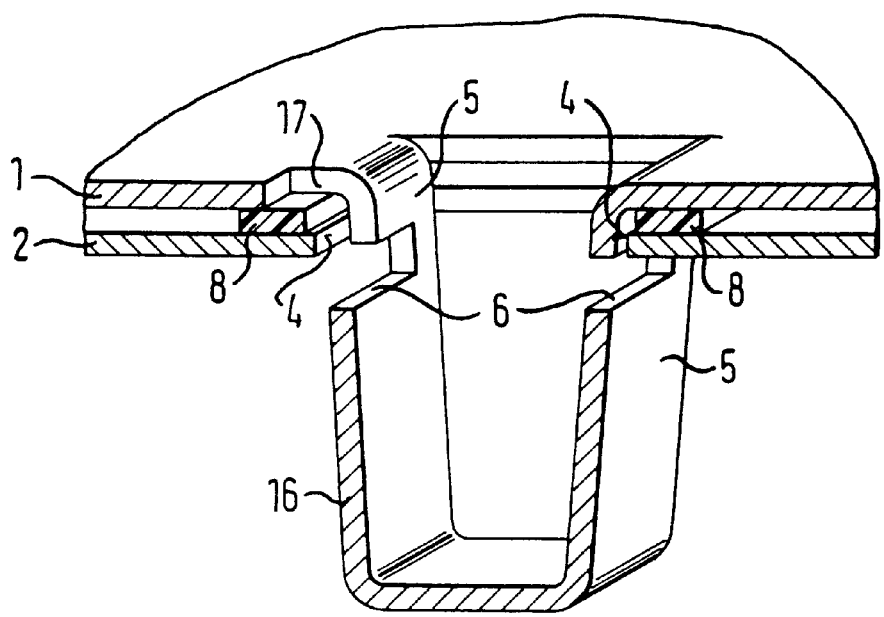
FIG. 4 is a section or perspective view of the fastening portion

The adapted installation situation is evident from FIG. 4. The lower plane component 2 has a preferably square or rectangular recess 4 in which two opposing, angled plane material sections 5 of the first component can engage. These parts may be connected to each other by a U-shaped base part, they featuring slot-type recesses 6 in the region below the lower defining plane of the second component 2. Between the two components an elastically deformable tensioning element 8 may be arranged should one of the components or both fail to be configured correspondingly elastically deformable in the fastening portion. Evident in the transition portion in the first component 1 to the plane, downwardly bent material section 5, is furthermore a window 17, the function of which will be explained later.

Figure 5:
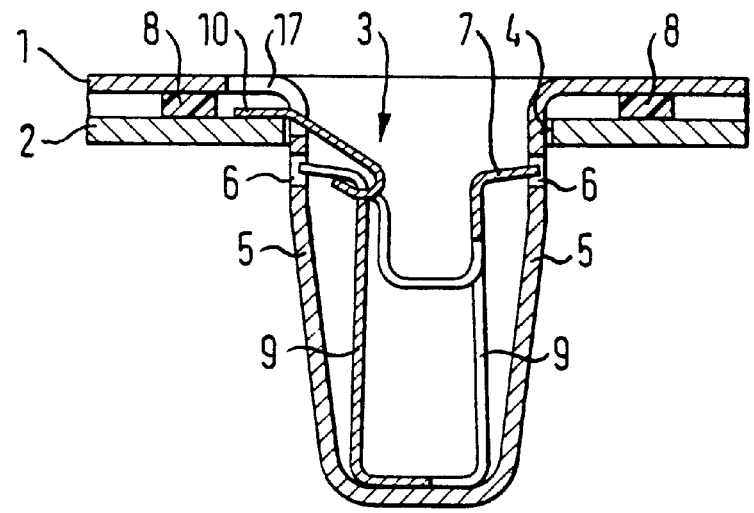
FIG. 5 is a section through the fastening portion as shown in FIG. 4 with the spring clip inserted

Referring now to FIG. 5 there is illustrated the installation situation of the spring clip 3 just before the unlatching of the hook-in device 13, 14. The components 1 and 2, as evident from FIG. 4, are inserted into each other, the downwardly bent material sections 5 of the first component 1 engaging the rectangular recess 4 of the second component. The slot-type recesses 6 are then located directly underneath the lower definition plane of the second component 2. The spring clip 3 pretensioned by means of the hook-in device 13, 14 (cf. FIG. 3) can then be inserted into the space between the downwardly bent material sections 5 of the first component 1 until the position as shown in FIG. 5 is attained. In this arrangement the lever 10 configured on the spring clip 3 is in contact with the second component 2 after it has negotiated the window 17 configured in the first component 1. When subsequently the spring clip 3 is pressed further downwards the elastically deformable tensioning element 8 arranged between the components 1 and 2 is compressed and the lever 10 of the spring clip moved upwards relative to the left-hand leg of the latter, as a result of which the hook-in device 13, 14 is caused to unlatch and the spring clip 3 assuming the position as evident from FIG. 2. In this action the outwardly bent flanges 7 move through the recesses 6 in the plane material sections 5 and come into contact below the second component 2 in the rim portion of the rectangular recess 4. The components 1 and 2 are thus connected to each other, the restoring forces of the elastically deformable tensioning element 8 ensuring that the spring clip is downwardly in contact with the second component 2 with a certain pretension. The restoring forces of the spring clip 3 itself ensure that the spring clip 3 maintains the relaxed position as shown in FIG. 2.

Figure 6:
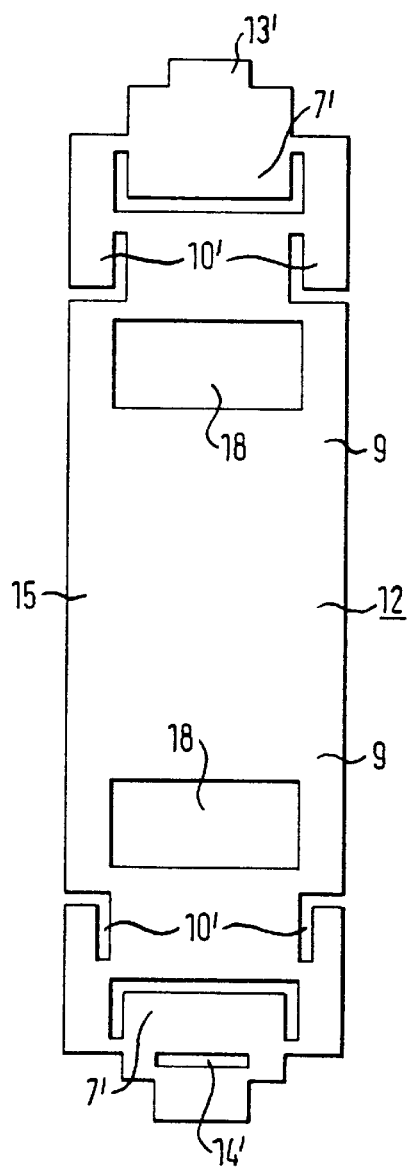
FIG. 6 shows a sheet metal section for producing a spring clip as shown in FIG. 8
Figure 7:
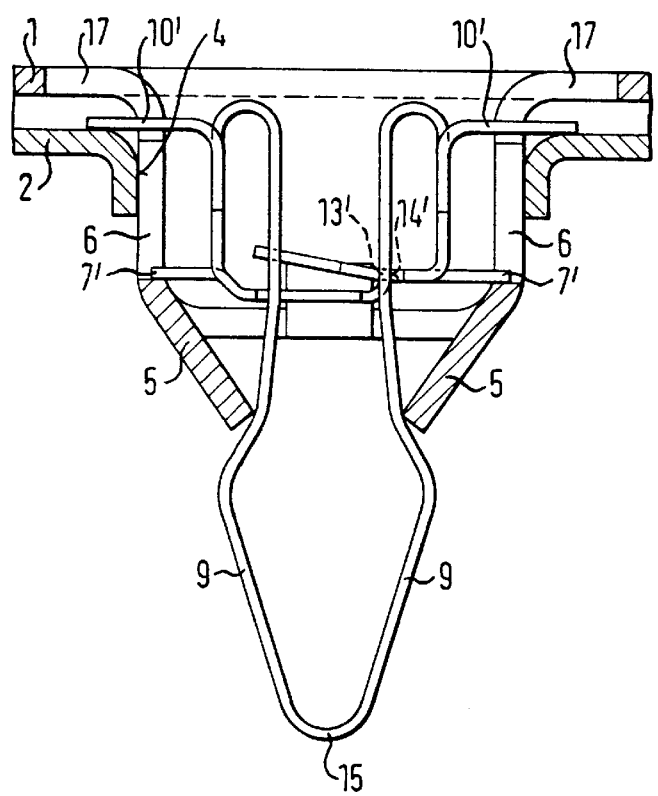
FIG. 7 is a section through the installation portion with the spring clip inserted
Figure 8:
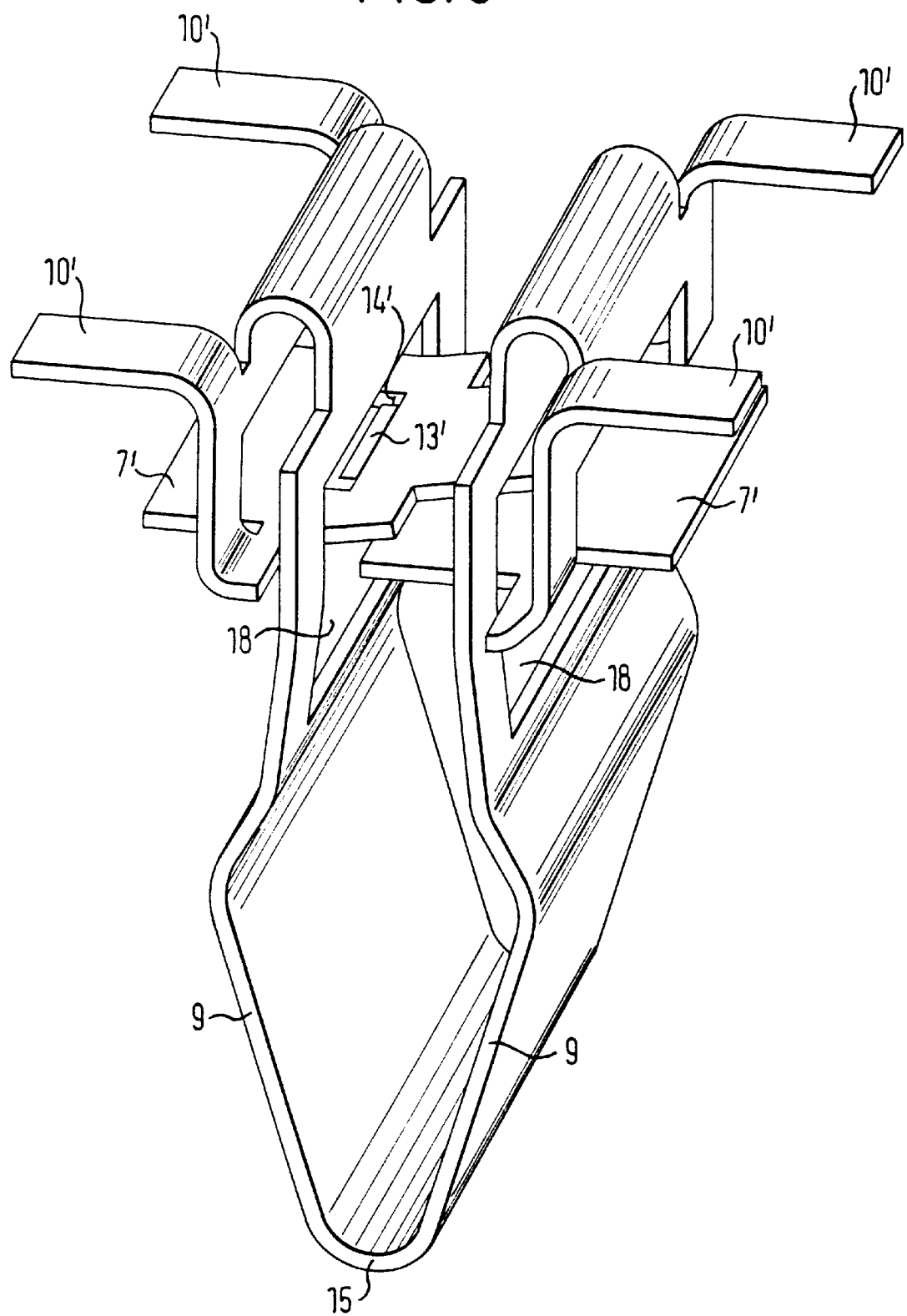
FIG. 8 is a perspective view of the spring clip produced from the sheet metal section as shown in FIG. 6.

In a similar way the sheet metal strip 12 as evident from FIG. 6 may be shaped by bending operations into a spring clip as shown in FIGS. 7 and 8, whereby starting from the base region the legs 8 are bent down V-shaped before then extending towards each other and finally—in the tensioned condition—lying substantially parallel to each other. By further bending operations the outwardly bent levers 10' and likewise outwardly bent flange sections 7' on the spring clip are configured. Also provided in the sheet metal section 12 are windows 18 through which the angled parts of the sheet metal strip 12 are able to engage to form a hook-in device 13', 14'. In this arrangement the hook-in device consists of a part 13' having an upwardly bent end which engages an adapted slot 14' in the tensioned condition of the spring clip. This is best evident from FIG. 8 in which the spring clip is illustrated perspectively in the tensioned condition.

Referring now to FIG. 7 there is illustrated the installation situation of the spring clip formed from a sheet metal strip 12 as shown in FIG. 6 and pretensioned as shown in FIG. 8 prior to unlatching of the hook-in device 13', 14'. In this case the rim of the rectangular recess 4 in the second component is bent downwards and the lower ends of the angled plane material sections 5 of the first component 1 are configured at their ends in a converging V-shape. In this embodiment two windows are provided in the first component 1, the levers 10' being able to pass through the windows to come into contact with the lower component 2. When the spring clip is pressed further downwards from the position as shown in FIG. 7, the levers 10' thereby being supported by the component 2, the hook-in device 13' and 14' is unlatched and the spring clip is able to assume its splayed position in which the outwardly bent flange sections 7' are able to engage through the slot-type recesses 6 in the first component 1 and come into contact with the downwardly bent rim of the recess 4 of the component 2, thus resulting in the two components 1 and 2 being connected to each other.

The fastening device in accordance with the invention satisfies all of the requirements as cited at the outset. It is usable in the case of fastening positions accessible from one side only, enables the unlatching position to be checked and permits connecting two plane components to each other with but a single fastening element. The outwardly bent flanges 7 permit the transmission of very high pull-out forces because they make a very short, simple run of the lines of force possible between the first and second component.

What is claimed is:

1. A device for fastening a first generally flat component to second generally flat component arranged parallel to the first component comprising a spring clip, said second component having a rectangular recess, said first component having two opposed angled flat material sections with slot-type recesses extending parallel to said second component, said material sections of said first component being inserted in the recess of said second component, and said spring clip having a U- or V-shaped cross-section and outwardly bent flanges which flanged are insertable between said material sections and supportable in said first component, and said flanges extending in a final assembly position through said slot-type recesses and engaging behind said second component.

2. The device as set forth in claim 1, wherein at least one elastically deformable tensioning element is arranged between said first and said second components, said tensioning element being compressible during assembly and, after assembly, said tensioning element permanently pressing said flanges of said spring clip against said second component.

3. The device as set forth in claim 1, wherein said spring clip has legs which, in a preassembled condition, are bent toward each other to such a degree and interlocked in this position, that said spring clip with said outwardly bent flanges can be introduced through said recess of said second component into a final assembly position.

4. The device as set forth in claim 3, wherein said spring clip has a lever which, on introduction of said spring clip, comes into contact with said second component thereby automatically unlatching said legs.

5. The device as set forth in claim 4, wherein at least one of said material sections of said first component has a window through which said lever is able to come into contact with said second component.

6. The device as set forth in claim 1, wherein said spring clip is produced in one piece from an elastic sheet-metal strip on which, in addition to said U- or V-shaped cross-section, a hook-in means is formed by stamping and bending, said legs of said spring clip being adapted to be latched with each other by means of said hook-in means.

7. The device as set forth in claim 6, wherein said spring clip is configured with a U-shaped cross-section, said legs having end flanges bent outwards approximately at right angles and extending divergent in a relaxed condition from said base toward said flanges and convergent in a tensioned condition, one of said legs having a recess with a hook-like protuberance which extends over said flange and over an adjoining part of another one of said legs, and a hook-in element being formed by stamping and bending from a base portion of said sheet-metal strip and from said other leg, said hook-like element having rim-sided slots for said hook-like protuberances and having a lever for unlatching said legs in said final assembly position.

8. The device as set forth in claim 6, wherein said spring clip, starting from said base portion, is firstly configured V-shaped in cross-section and subsequently configured with said legs bent inwards and finally oriented substantially linearly and parallel to each other in said latched condition, said legs being bent back at their ends through 180° and, by cutting and further bending through 90°, being provided with two outwardly directed levers each as well as with likewise outwardly directed flange sections, and a hook-in means formed from middle portions of said legs by cutting and bending, which hook-in means in said final assembly position is adapted to be unlatched by means of said levers.

9. The device as set forth in claim 1, wherein said spring clip is fixedly connected to said first component.

* * * * *